Sept. 14, 1965   G. G. PROULX   3,206,651
CIRCUIT CONTROLLING FLOW OF CURRENT
Filed Nov. 30, 1961

INVENTOR.
GEORGE G. PROULX
BY
ATTORNEY

United States Patent Office 3,206,651
Patented Sept. 14, 1965

3,206,651
CIRCUIT CONTROLLING FLOW OF CURRENT
George G. Proulx, Bedford, Mass., assignor to Honeywell Inc., a corporation of Delaware
Filed Nov. 30, 1961, Ser. No. 156,040
8 Claims. (Cl. 317—148.5)

The present invention relates in general to a new and improved switching circuit and in particular to a switching circuit for use with a magnetically operated actuator.

The magnetic force required to energize an electromechanical actuator such as a solenoid, relay or the like usually exceeds that required to sustain it in its energized state. The switching circuit used to control the energizing current of such an actuator may therefore include means for initially applying a relatively large current to the actuator and later reducing this current to the level necessary to hold the actuator in its energized state.

To this end, prior art switching circuits frequently include a parallel resistor-condenser combination in series with the actuator current path. During the switching interval, the condenser acts as a low impedance current path with respect to the resistor and thus provides a high value of switching or boost current to the actuator. Subsequently, as the condenser charges, the current flow through the actuator decreases to the hold-current level established by the series-connected resistor. When it is desired to switch the actuator back to its initial position, the applied energizing current drops to zero.

This method for obtaining an additional boost current during the switching cycle has been found to be unsatisfactory when used with an actuator which requires a large energizing current and which must be operated at a high repetition rate or duty cycle. In order to supply such a current during the switching period, the condenser must have a large value. When the actuator is de-energized, the voltage established across this condenser must discharge through the associated shunt resistor. If the actuator is re-energized before the condenser discharge is complete, the boost current delivered to the actuator during the following operating cycle will be of a lower value than that previously applied. The recovery time required for the condenser to discharge fully will therefore limit the maximum operating rate of the actuator.

In an attempt to overcome these disadvantages, prior art devices have at times resorted to the use of parallel resistor combinations in series with the actuator current path. A switching device in series with one of the resistors is controlled in timed relationship with respect to the input signal which energizes the solenoid. While the resistors are connected in parallel, the impedance in series with the actuator current path is small and a large boost current results. When the switching device opens its portion of the circuit path and takes the connected resistor out of the circuit, the total impedance in the actuator current path increases and the energizing current decreases to the actuator holding level.

In order to reduce the cost of the equipment the same switching circuit may control more than one solenoid provided, of course, that the solenoid operating periods do not overlap in time. Such an arrangement in the circuit described above, requires additional switches in the respective actuator current paths to provide proper selectivity between them. As a consequence, the total equipment required is increased and the advantages derived from the time-sharing of the switching circuitry are compromised.

It is a primary object of the present invention to provide a switching circuit for a magnetic actuator which permits a high operating rate of the latter.

It is a further object of the present invention to provide a switching circuit for a magnetic actuator which permits accurate control of the energizing current of the latter.

It is another object of the present invention to provide a relatively simple and economical switching circuit which may be time-shared by a plurality of magnetic actuators to control the energizing current of the latter.

In the present invention, the magnetic actuator is coupled to a source of energizing current through transistor switching circuitry. The current path for the actuator includes a pair of series-connected resistors adapted to limit the energizing current through the actuator to a desired hold value. Upon the initial energization of the actuator, a second transistor switching circuit is adapted to provide a low impedance path in shunt with one of these current-limiting resistors. The increased current flow, or boost current, which is obtained will aid in speeding up the switching of the actuator. Since the second transistor switching circuit is non-reactive and hence time-invariant, the duration of the boost current may be solely controlled with respect to the initiation of the energizing current, e.g. by means of a timed device such as a univibrator.

The foregoing and other objects and features of the invention will best be understood from the following detailed description when taken in conjunction with the accompanying drawings in which.

Figure 1:
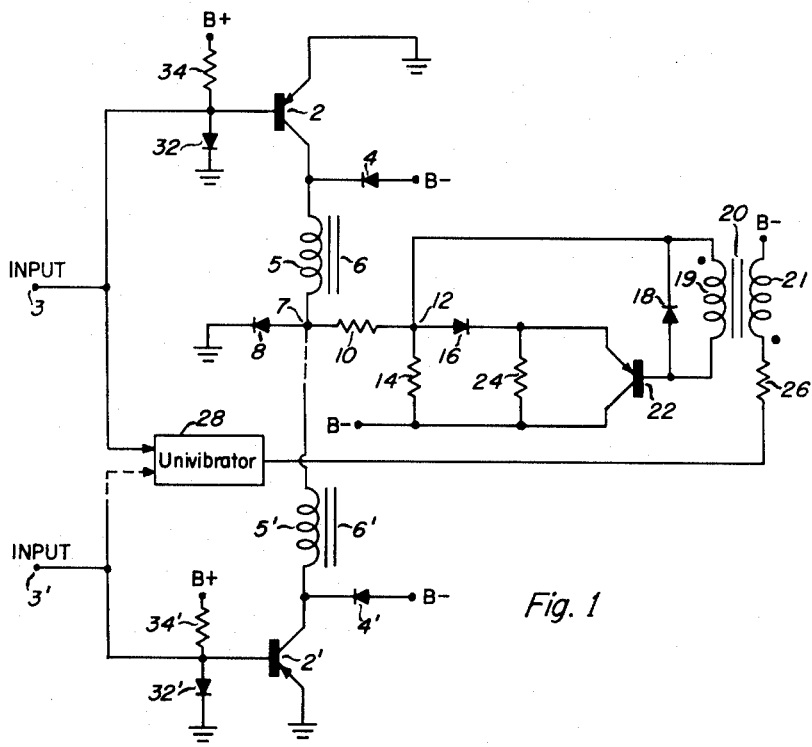
FIGURE 1 illustrates a preferred embodiment of the present invention.

Referring now to FIGURE 1, there is shown a transistor 2 which has its base connected to an input terminal 3. The transistor emitter is connected to ground. The transistor collector is connected to the cathode of a diode 4 as well as to one terminal of the solenoid coil 5 of a magnetic actuator 6. The anode of diode 4 is returned to a negative potential source B—. The other terminal of the solenoid coil 5 is connected to a junction point 7. The anode of a diode 8 and one terminal of a resistor 10 are further connected to point 7. The cathode of diode 8 is returned to ground and the other terminal of resistor 10 is connected to a junction point 12. Junction point 12 further connects one terminal of a resistor 14, the anode of a diode 16, the cathode of a diode 18 and a terminal of the secondary winding 19 of a transformer 20. The other terminal of the secondary winding 19 is connected to the base of a transistor 22 as well as to the anode of a diode 18.

The cathode of diode 16 is connected to the emitter of transistor 22 and to one terminal of a resistor 24. The other terminals of resistors 14 and 24 respectively are connected to the aforesaid B— source, together with the collector of transistor 22. The primary winding 21 of transformer 20 is connected between the B— source and one terminal of a resistor 26. The other terminal of resistor 26 is connected to the output lead of a univibrator circuit 28. The input lead of the univibrator circuit 28 is connected to the aforesaid input terminal 3. Input terminal 3 is further connected to the anode of a diode 32 and to one terminal of a resistor 34. The other end of resistor 34 is returned to a positive potential source B+ and the cathode of diode 32 is connected to ground.

A further magnetic actuator 6' and its associated circuit may be coupled to the above-described apparatus, as illustrated by means of broken-line connections in FIGURE 1. The latter circuit is substantially identical to the actuator circuitry described above, corresponding portions having been labeled with prime reference numerals.

An input terminal 3' is connected to the base of a transistor 2', as well as to the univibrator 28. Additionally, terminal 3' is connected to the junction point of a resistor 34' and the anode of a diode 32' whose cathode is connected to ground. The other terminal of resistor 34' is connected to the aforesaid D.C. source B+.

The emitter of transistor 2' is connected to ground and its collector is connected to the cathode of a diode 4' whose anode is coupled to the B— source. The emitter of transistor 2' is further connected to one terminal of a solenoid coil 5' of the aforesaid magnetic actuator 6'. The other terminal of coil 5' is connected to junction point 7.

Figure 2:
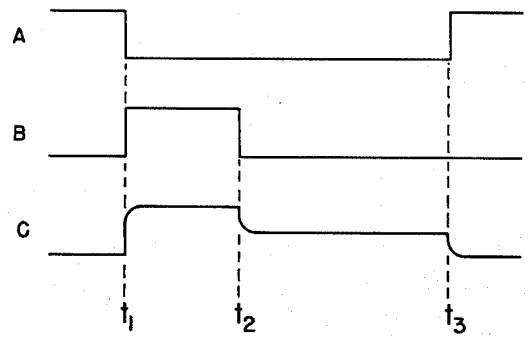
FIGURE 2 illustrates certain waveforms necessary to form an understanding of the operation of the invention.

The operation of the apparatus illustrated in FIGURE 1 will be discussed with the aid of the waveforms of FIGURE 2. The operation is substantially identical for both actuators 6 and 6' and will be explained only with reference to actuator 6. It will be understood that the control circuitry can be time-shared only by the actuators shown if they are operative at different times of the operating cycle. It will be further seen that the invention is not confined to a pair of actuators, but that the control circuitry may be time-shared by any number of actuators subject to the above-mentioned limitations.

In operation, the transistor 2 is normally held in a cut-off condition. A reverse bias potential is established across the base-emitter junction of this transistor by means of the forward voltage drop across clamp diode 32. The forward current flow through this diode will be furnished by way of the B+ source and the current-limiting resistor 34. As long as transistor 2 remains in the cut-off state, the collector-emitter path of this transistor will approximate an open-circuit condition and there will be no current flowing through the solenoid 5 of the magnetic actuator 6.

Upon the application of a negative-going input signal, such as that shown in FIGURE 2A to the input terminal 3, transistor 2 will become conductive and the current flow through its base-emitter junction will be sufficient to drive it into its saturation region. Thus the emitter-collector path of this transistor will provide a low-impedance path for the current flow through the solenoid 5.

The operation of univibrators is well understood in the art today. Such a circuit normally resides in one stable state and is driven to a quasi-stable state upon the application of a pulse. A predetermined time interval thereafter it reverts to its stable state. Concurrently with the action of rendering transistor switch 2 conductive the negative-going input signal will also cause the univibrator circuit 28 to switch to its quasi-stable state. A representative output signal from the univibrator circuit is shown by the waveform illustrated in FIGURE 2B. The positive-going signal produced by the univibrator circuit is coupled to the primary winding 21 of transformer 20. The time duration of this univibrator signal may be adjusted to exceed the switching time of the magnetic actuator 6. Thus, as shown in FIGURE 2B, the univibrator signal remains positive for the time interval between $t_1$ and $t_2$. When the univibrator signal is applied to the transistor 22 through the coupling action of transformer 20, it causes transistor 22 to conduct. The resultant current flow through the base-emitter junction of transistor 22 is sufficient to drive it to saturation. The emitter-collector junction of this transistor then provides a low impedance in shunt with the current-limiting resistor 14.

As a consequence, the current flow through the winding 5 of the magnetic actuator 6 is large. The current increment is referred to as the boost current and raises the total energizing current to a level sufficient to initiate the switching of the magnetic actuator 6. The path of the energizing current can be traced from the ground terminal through to the emitter-collector junction of transistor 2, solenoid winding 5, resistor 10, diode 16 and the emitter-collector path of transistor 22 to the B— source. Since transistors 2 and 22 both present a very low impedance path to current flow as does the forward-biased diode 16, the current flow through the magnetic actuator winding 5 is limited only by the value of resistor 10. Due to the fact that transistor 22 is non-reactive and hence time-invariant, the boost current remains constant until the univibrator 28 switches back to its stable state. The time duration of the univibrator signal may be adjusted to exceed the switching time of the actuator 6. The value of resistor 10 is selected to provide a boost current during the switching interval of magnetic actuator 6 sufficiently large to effect the switching of the actuator.

Upon the resetting of the univibrator circuit 28 to its stable state, the boost signal induced into the secondary winding of transformer 20 decays rapidly through the discharge path provided by diode 18. As a consequence, transistor 22 will be cut off and resistor 14 will be placed into the energizing current path of magnetic actuator 6. The positive transient produced by the change in current flow through the actuator winding 5 is eliminated by the action of diode 8. The resetting of univibrator circuit 28 is shown at time $t_2$ in the waveform illustrated in FIGURE 2B. The boost current flow through the magnetic actuator winding is shown in FIGURE 2C during the time intervals $t_1$ to $t_2$.

The addition of resistor 14 to the current path of winding 5 of the magnetic actuator reduces the current flow through this device to the value necessary to hold the actuator in its energized state. This hold current is shown in FIGURE 2C during the time intervals $t_2$–$t_3$. The series combination of diode 16 and resistor 14 is effective to maintain transistor 22 in the cut-off condition during the hold-current interval. The value of resistor 24 is high in comparison with that of resistor 14 and provides sufficient current flow to forward-bias diode 16. The forward voltage drop across diode 16 is applied across the base-emitter junction of transistor 22 by way of the low impedance path of the transformer secondary winding 19. This reverse-bias voltage across the base-emitter junction of transistor 22 assures that it remains in the cut-off condition during the hold-current interval.

When the signal at the input terminal 3 goes positive, as illustrated at time $t_3$ in FIGURE 2A, transistor 2 will cut off and will open the energizing current path through winding 5 of the magnetic actuator 6. The negative-going transient produced at the collector of transistor 2 by the flux field collapse in magnetic actuator 6 will be held to B— potential by the action of clamp diode 4. The resulting decay of current flow through the magnetic actuator 6 is shown at time $t_3$ of FIGURE 2C.

Unlike prior art circuits wherein the boost current applied to the actuator during its switching interval decays at an exponential rate, the present invention provides a circuit wherein the boost current is maintained constant for a precisely controlled time interval, as determined by the setting of univibrator 28. By eliminating the shunt condenser which is normally connected across the current-limiting resistors, the recovery time of the circuit is greatly reduced. As a consequence, the actuator may be disconnected and re-energized immediately following the resetting of the univibrator circuit without any reduction in the boost current amplitude.

Since the total energizing current flowing through the actuator winding 5 also flows across the emitter-collector junction of transistor 2, the current flow through the actuator winding can be terminated prior to the completion of the univibrator cycle. Moreover, the control circuit portion may readily be time-shared by one or more actuators, such as the actuator 6' and its associated circuitry. Such operation requires only that the signal applied to input terminal 3 be zero while a pulse is applied to the input terminal 3'.

The electronic switching circuit described above was used in conjunction with a solenoid actuator in a tape drive vacuum-pressure circuit. The values of the current-limiting resistors were adjusted to provide a boost current of 7.5 amperes and a hold current of 1.5 amperes. The univibrator duration control was adjusted for a boost current interval approximating 1.5 milliseconds and the maximum operational rate of this solenoid actuator was well within 5 milliseconds.

While there has been shown and described a particular embodiment of the present invention, it will be understood that modifications and alternative constructions may be made without departing from the spirit and scope of the invention. Therefore, the appended claims are intended to cover all such modifications and alternative constructions that fall within their true spirit and scope.

What is claimed is:

1. A boost circuit for providing an energizing current, comprising at least one actuator, an energizing current path including first switching means and impedance means coupled in series with said actuator, means for deriving an input signal adapted to render said first switching means conductive, non-reactive second switching means coupled in shunt with at least a portion of said impedance means, and means responsive to the initiation of said input signal to render said second switching means conductive during a predetermined time interval, said current path having a relatively low constant impedance between the initiation of said input signal and the end of said interval and a relatively high constant impedance thereafter until the termination of said input signal.

2. A current boost circuit, comprising a magnetic actuator, first and second transistors each having a base, an emitter and a collector, an input terminal, said first transistor having its base connected to said input terminal and its emitter connected to ground, said magnetic actuator having one terminal connected to the collector of said first transistor and its second terminal connected to one end of a series combination comprising a first and second resistor, the other end of said series combination being coupled to a point of D.C. potential, means for coupling the emitter and collector of said second transistor across said second resistor, a univibrator circuit connected to said input terminal, and means for coupling the output signal from said univibrator to the base of said second transistor, said univibrator signal being adapted to render said second transistor conductive to decrease the impedance in the current path of said actuator.

3. A circuit for controlling the flow of current, comprising at least one current-energized actuator, means for deriving an input signal, means adapted to render the energizing current path of said actuator conductive for the duration of said input signal, a plurality of impedances series-connected in said current path, means responsive to said input signal for deriving a switching signal of limited duration, and time-invariant means responsive to said switching signal for shunting at least some of said impedances to increase the current flowing in said path for the duration of said switching signal.

4. A control circuit, comprising a current-energized actuator, means for deriving an input signal, means for rendering the energizing current path of said actuator conductive for the duration of said input signal, impedance means coupled in said current path, signal modifying means responsive to said input signal, and time-invariant means responsive to said signal modifying means for shunting said impedance means during a predetermined time interval.

5. A circuit for controlling the flow of current, comprising at least one current-energized actuator, means for deriving an input signal, first transistor switching means adapted to render the energizing current path of said actuator conductive for the duration of said input signal, a plurality of impedances series-connected in said current path, means responsive to said input signal for deriving a switching signal of limited duration, and second transistor switching means responsive to said switching signal for shunting at least some of said impedances to increase the current flowing in said path for the duration of said switching signal.

6. A control circuit, comprising at least one current-energized actuator, means for deriving an input signal, means for rendering the energizing current path of said actuator conductive for the duration of said input signal, means responsive to said input signal for deriving a switching signal of limited duration, impedance means coupled in said current path, and time-invariant means responsive to said switching signal for shunting at least a portion of said impedance means to increase the current flowing in said path for the duration of said switching signal.

7. A current boost circuit, comprising a magnetic actuator, first and second transistors each having a base, an emitter and a collector, an input terminal, said first transistor having its base connected to said input terminal and its emitter connected to ground, said magnetic actuator being connected between the collector of said first transistor and a junction point, first and second resistors connected in series between said junction point and a source of negative D.C. potential, a first diode having its anode connected to the common junction of said first and second resistors and its cathode connected to the emitter of said second transistor, a transformer having primary and secondary windings, said secondary winding being connected between said common junction and the base of said second transistor, a univibrator connected between said input terminal and one terminal of said primary winding, said D.C. source being connected to the other terminal of said primary winding and to the collector of said second transistor, a third resistor connected between the emitter and collector of said second transistor, and a second diode connected across said transformer secondary winding; whereby said univibrator is adapted to render said second transistor conductive during a predetermined time interval following the initiation of said input signal to boost the current flowing through said actuator by shunting said second resistor with a low impedance path.

8. The apparatus of claim 7 and further comprising at least one additional actuator having one terminal connected to said junction point, a transistor corresponding to said last-recited actuator having its emitter-collector junction connected to the other actuator terminal, and an additional input terminal connected to the base of said transistor and to said univibrator, said input terminals being energized during mutually exclusive time intervals.

References Cited by the Examiner

UNITED STATES PATENTS

| | | | |
|---|---|---|---|
| 2,928,027 | 3/60 | Dennison | 317—154 X |
| 2,945,990 | 7/60 | Hipple | 317—154 X |
| 3,021,454 | 2/62 | Pickens | 317—148.5 |
| 3,078,393 | 2/63 | Winston | 317—148.5 X |
| 3,092,760 | 6/63 | Manners et al. | 317—148.5 |
| 3,097,307 | 7/63 | Bonn | 307—88.5 |
| 3,098,216 | 7/63 | Samwel. | |
| 3,116,441 | 12/63 | Gieffers | 317—148.5 |
| 3,133,204 | 5/64 | Winchel | 317—154 X |

FOREIGN PATENTS 522,986    7/40    Great Britain.

SAMUEL BERNSTEIN, *Primary Examiner.*